United States Patent
Breunig et al.

(10) Patent No.: US 10,301,567 B2
(45) Date of Patent: May 28, 2019

(54) LUBRICATION METHOD

(71) Applicant: ELKEM SILICONES FRANCE SAS, Lyons (FR)

(72) Inventors: Stefan Breunig, Villette de Vienne (FR); Gérald Guichard, Givors (FR); Jérôme Bordas, St Priest (FR)

(73) Assignee: ELKEM SILICONES FRANCE SAS, Lyons (FR)

( * ) Notice: Subject to any disclaimer, the term of this patent is extended or adjusted under 35 U.S.C. 154(b) by 243 days.

(21) Appl. No.: 15/103,901

(22) PCT Filed: Dec. 12, 2014

(86) PCT No.: PCT/EP2014/003339
§ 371 (c)(1),
(2) Date: Jun. 13, 2016

(87) PCT Pub. No.: WO2015/090547
PCT Pub. Date: Jun. 25, 2015

(65) Prior Publication Data
US 2016/0376517 A1   Dec. 29, 2016

(30) Foreign Application Priority Data

Dec. 16, 2013 (FR) ..................... 13 02948

(51) Int. Cl.
| | | |
|---|---|---|
| *C10M 107/50* | (2006.01) | |
| *C10M 173/02* | (2006.01) | |
| *B29D 30/06* | (2006.01) | |
| *C10M 169/04* | (2006.01) | |
| *B29C 33/64* | (2006.01) | |
| *B29C 37/00* | (2006.01) | |
| *B29K 105/24* | (2006.01) | |

(52) U.S. Cl.
CPC ......... *C10M 107/50* (2013.01); *B29C 33/64* (2013.01); *B29C 37/0067* (2013.01); *B29D 30/0654* (2013.01); *C10M 169/044* (2013.01); *C10M 173/02* (2013.01); *B29D 2030/0659* (2013.01); *B29K 2105/246* (2013.01); *C10M 2201/02* (2013.01); *C10M 2201/041* (2013.01); *C10M 2201/102* (2013.01); *C10M 2201/103* (2013.01); *C10M 2201/12* (2013.01); *C10M 2207/123* (2013.01); *C10M 2209/104* (2013.01); *C10M 2209/12* (2013.01); *C10M 2219/044* (2013.01); *C10M 2219/104* (2013.01); *C10M 2223/042* (2013.01); *C10M 2229/025* (2013.01); *C10M 2229/041* (2013.01); *C10M 2229/042* (2013.01); *C10M 2229/0415* (2013.01); *C10M 2229/0445* (2013.01); *C10M 2229/0465* (2013.01); *C10M 2229/0515* (2013.01); *C10N 2210/01* (2013.01); *C10N 2210/03* (2013.01); *C10N 2220/022* (2013.01); *C10N 2220/082* (2013.01); *C10N 2230/06* (2013.01); *C10N 2240/58* (2013.01)

(58) Field of Classification Search
None
See application file for complete search history.

(56) References Cited

U.S. PATENT DOCUMENTS

| | | | | |
|---|---|---|---|---|
| 2010/0043933 A1* | 2/2010 | Breunig | ............ | B29C 33/64 152/209.1 |
| 2013/0228259 A1* | 9/2013 | Breunig | ............ | B29C 33/64 152/450 |

FOREIGN PATENT DOCUMENTS

| | | |
|---|---|---|
| EP | 0022706 A1 | 1/1981 |
| FR | 2887895 A1 | 1/2007 |

OTHER PUBLICATIONS

International Search Report dated Mar. 18, 2015, and English Translation of the International Search Report corresponding to International Patent Application No. PCT/EP2014/003339, 4 pages.

* cited by examiner

*Primary Examiner* — Robert J Grun
(74) *Attorney, Agent, or Firm* — Dentons US LLP

(57) ABSTRACT

A method of lubricating an expandable rubber bladder is described for use during a vulcanization of a green tire within a metal press. The method can include applying compositions in the form of emulsions of silicone oils to the inner surface of the green tires and/or to the outer surface of the vulcanization bladders to facilitate the molding-demolding thereof during the manufacture of the tires.

19 Claims, No Drawings

LUBRICATION METHOD

CROSS-REFERENCE TO PRIOR APPLICATIONS

This application is a National Stage of PCT/EP2014/003339, filed Dec. 12, 2014, and designating the United States (published on Jun. 25, 2015, as WO 2015/090547 A1), which claims priority under 35 U.S.C. § 119 to French Patent Application No. 13/02948, filed Dec. 16, 2013, each hereby expressly incorporated by reference in its entirety and each assigned to the assignee hereof.

The present invention relates to a method for lubricating an expandable rubber bladder of use during a vulcanization of a green tire within a metal press, characterized in that compositions in the form of emulsions of silicone oils are applied to the inner surface of the green tires and/or to the outer surface of the vulcanization bladders to facilitate the molding-demolding thereof during the manufacture of said tires.

The manufacture of a tire mainly comprises three steps, namely the preparation of the semi-finished products, the assembly of the latter and the curing of the tire casing. The preparation of the semi-finished products consists in producing the constituents of the tire casing: rubbers, textile and metal plies, bead wires.

The assembly step consists in superposing the various semi-finished products, with a view to forming the tire. The carcass, consisting of various inner layers: inner liner, carcass ply, bead wires, and all the plies of rubbers, is placed on a cylinder having the diameter of the tire: the drum. After shaping, the drum giving the carcass its toric appearance, the belt plies and the tread are positioned: a green tire, an unvulcanized and unshaped tire casing, which is still plastic is obtained. At the end of the assembly step, the future tire is also referred to as a green tire or green tire casing. Its cohesion is guaranteed simply by the green tack of the products.

Finally, the curing changes the tire from the plastic state to the elastic state owing to the formation of sulfur bridges between the elastomer chains: this is the vulcanization. Curing creates the composite structure between the various elements of the tire casing. The compounds adhere to one another, the plies and the threads mix together. In-mold vulcanization is carried out in metal presses using the combined action of heat and pressure. The green tire is heated simultaneously on the outside, for example with steam circulating inside the walls of the mold and on the inside, as a general rule with a pressurized hot fluid contained in a rubber membrane, also referred to as an expandable bladder.

The hot fluid such as a hot gas, hot water and/or steam, participates in the heat transfer for the vulcanization.

The pressure generally above 10 bar, usually between 15 and 25 bar, serves to compress the tire from the inside and to apply it against the mold so that it can adopt the shape, the tread patterns and the markings that have been engraved in said metal mold.

The vulcanization time varies as a function of the dimensions of the tire, the operating techniques and the compounds used: it is around 15 minutes for a motor vehicle tire and may reach 24 hours or more for large tires intended for earth-moving machinery. The vulcanization temperature is in general between 80 and 220° C.

This operation makes the rubber compound lose its initial plasticity by giving it stable elastic properties.

The tire casing is then partially cooled in the mold, this cooling being sometimes promoted by the introduction of cold or cooler water into the bladder. Then the mold is opened and the bladder is deflated by releasing the pressure of the internal fluid, and the vulcanized tire is removed from the press. This use of vulcanization bladders is well known in the art.

It is accepted that there is a sizeable relative movement between the outer contact surface of the bladder and the inner surface of the green tire casing during the bladder expansion phase before the complete vulcanization of the tire casing. Similarly, there is also a considerable relative movement between the outer contact surface of the bladder and the inner surface of the molded and vulcanized tire casing, during the deflation of the bladder and the extraction from the tire.

If adequate lubrication is not provided between the bladder and the inner surface of the tire casing, the bladder generally has a tendency to warp, which leads to a deformation of the tire casing in the mold and also excessive wear and roughening of the surface of the bladder itself. The surface of the bladder also tends to adhere to the inner surface of the tire casing during the curing. After the vulcanization of the tire casing and in particular during the final part of the vulcanization cycle of the tire casing during which the bladder is deflated, the latter then remains inseparably bonded to the tire.

It is a question of demolding two rubber surfaces, namely the inner surface of the vulcanized tire from the outer surface of the bladder and not the outer surface of the vulcanized tire from the inner surface of the metal mold. EP 022 706 describes an agent for molding rubber articles to be deposited on the outer surface of the rubber blank in contact with the mold.

Furthermore, the bladder must be able to be reused without new treatment for other molding/demolding cycles. For this reason, the outer surface of the bladder or the inner surface of the green or unvulcanized tire casing is coated with an appropriate lubricant or mold release agent.

The use of a multi-demolding mold release agent enables tire manufacturers to improve the productivity by reducing the rate of appearance of defects and by reducing the frequency of treatments by said mold release agent.

The lubrication of the vulcanization bladder used during the shaping and vulcanization of the green tires may be carried out in two different ways.

The expandable rubber bladder used during the vulcanization of the green tires is initially coated with a lubricating composition. The lubrication of the bladder is direct.

In a different way, the mold release agent is applied to the inside of the green tire which will be in contact with the expandable bladder. Then, the green tire is introduced inside the press. The mold is closed and the bladder is inflated. The mold release agent ensures the optimal centering of the bladder inside the tire which is necessary for obtaining perfectly symmetrical tires. It also helps to prevent defects of the bladder such as pinching and creasing. When the metal mold is closed and the bladder completely deployed, the temperature is increased up to 220° C. During this phase, the mold release agent must be resistant to the temperature and must transfer from the inner face of the tire to the outer face of the bladder. This transfer is desirable for increasing the number of successive demolding operations without new application of the mold release agent. The tire is vulcanized in the closed press, with the bladder completely deployed by a pressurized fluid, between 150 and 220° C. During this step, the tire must not adhere to the bladder. The film of mold release agent forms the necessary barrier between the tire and the bladder. The nonstick effect of the mold release agent is provided by the creation of a continuous separating layer between the bladder and the inner face of the tire. This is the main function of a bladder mold release agent. If the barrier has defects, the vulcanization of the tire may be carried out on the rubber of the bladder, rendering the separation of the two impossible without destructive failure. After vulcanization, the bladder is deflated. The mold release agent must provide the nonstick effect, enabling the bladder to be detached from the tire. The mold release agent that enables several demolding operations is not applied to each tire. It must therefore have a high durability. The durability of the layer of mold release agent is that which makes the mold release agent a multi-demolding mold release agent. The mold release agent is again applied after a certain number of molding/demolding cycles.

The advantage of applying the mold release agent to the inside of the green tire is that this is carried out outside of the press, thus avoiding any inopportune pollution thereof.

Silicone compositions that can be crosslinked to elastomers for facilitating the molding-demolding during the manufacture of tires are known.

Thus, patents EP 1 240 283, EP 1 495 076 and patent application EP 2 038 354 relate to lubricating compositions based on siloxanes capable of crosslinking by polycondensation and that therefore do not release hydrogen. Patent application EP 1 899 447 and patent U.S. Pat. No. 4,840,742 relate to silicone compositions capable of crosslinking by dehydrogenation-condensation. However, the presence of mica-type filler favorable to the evacuation of air during the step of shaping and vulcanizing the tires has a tendency to reduce the number of demolding operations that can be envisaged before a new reapplication to the green tire and/or to the expandable bladder.

The lubrication and the durability of the expandable rubber bladder used during the step of vulcanizing green tires in a metal press must be continually improved in order to increase the number of demolding operations between two applications.

One objective of the present invention is to provide a method for treating an expandable rubber bladder within a metal press that makes it possible to obtain a bladder that corresponds simultaneously to these requirements, namely improved properties of slip and of resistance to successive demolding operations.

For this purpose, the first subject of the invention relates to a method for lubricating an expandable rubber bladder of use during a vulcanization of a green tire within a metal press, characterized in that the outer surface of said expandable rubber bladder, brought to be in contact with the inner face of said green tire, is coated with a mold release agent composition (I) in the form of an oil-in-water emulsion comprising:

(a) at least one reactive polyorganosiloxane (A) comprising, per molecule, at least two ≡SiOH silanol groups;
(b) at least one crosslinking agent (B) having, per molecule, at least three ≡SiH units;
(c) at least one non-reactive linear polyorganosiloxane oil (C) which is a linear homopolymer or copolymer which has, per molecule, monovalent organic substituents, which are identical to or different from one another, bonded to the silicon atoms, and which are selected from the group consisting of $C_1$-$C_6$ alkyl, $C_3$-$C_8$ cycloalkyl, $C_6$-$C_{10}$ aryl and $C_7$-$C_{15}$ alkylaryl radicals;
(d) glass beads (D) as spherical amorphous filler;
(e) at least one surfactant (E);
(f) optionally at least one additive (F) selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent;
(g) optionally at least one dehydrogenation-condensation catalyst (G), and
(h) water (H),
the amounts of surfactant(s) and of water being sufficient to obtain an oil-in-water emulsion; said method making it possible thus to obtain an expandable rubber bladder that is lubricated on its outer surface and resulting in several green tire molding and vulcanized tire demolding cycles.

The bladder treated according to the method of the invention simultaneously has excellent slip and durability properties.

According to another embodiment, the method for lubricating an expandable rubber bladder of use during a vulcanization of a green tire within a metal press, is characterized in that in a first step and outside of the press, the inner surface of said green tire is coated with a mold release agent composition (I) in the form of an oil-in-water emulsion comprising at least:

(a) at least one reactive polyorganosiloxane (A) comprising, per molecule, at least two ≡SiOH groups;
(b) at least one crosslinking agent (B) having, per molecule, at least three ≡SiH units;
(c) at least one non-reactive linear polyorganosiloxane oil (C) which is a linear homopolymer or copolymer which has, per molecule, monovalent organic substituents, which are identical to or different from one another, bonded to the silicon atoms, and which are selected from the group consisting of $C_1$-$C_6$ alkyl, $C_3$-$C_8$ cycloalkyl, $C_6$-$C_{10}$ aryl and $C_7$-$C_{15}$ alkylaryl radicals;
(d) glass beads (D) as spherical amorphous filler;
(e) at least one surfactant (E);
(f) optionally at least one additive (F) selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent;
(g) optionally at least one dehydrogenation-condensation catalyst (G), and
(h) water (H),
the amounts of surfactant(s) and of water being sufficient to obtain an oil-in-water emulsion; thus making it possible to obtain a green tire, the inner surface of which is coated with said composition (I) and
during a subsequent step within the metal press, the green tire, the inner surface of which is coated with said composition (I), is brought into contact with an expandable rubber bladder; said method making it possible thus to obtain, by transfer, an expandable rubber bladder that is lubricated on its outer face and resulting in several green tire molding and vulcanized tire demolding cycles.

The number of green tire molding and vulcanized tire demolding cycles is strictly greater than 8 and is more particularly between 10 and 20.

The mold release agent composition (I) may be obtained by mixing emulsions containing, as predominant constituents, the constituents (A), (B) and (C) alone or as a mixture.

To describe the polyorganosiloxanes, reference is made to M, D, T, Q units. The letter M represents the monofunctional unit of formula $(CH_3)_3SiO_{1/2}$, the silicon atom being bonded to a single oxygen atom in the polymer comprising this unit.

The letter D signifies a difunctional unit $(CH_3)_2SiO_{2/2}$ in which the silicon atom is bonded to two oxygen atoms. The letter T represents a trifunctional unit of formula $(CH_3)SiO_{3/2}$, in which the silicon atom is bonded to three oxygen atoms. The letter Q represents a trifunctional unit of formula $SiO_{4/2}$, in which the silicon atom is bonded to four oxygen atoms. The M, D, T units may be functionalized which has the effect of replacing one or more $CH_3$ radicals with another radical such as mentioned above. Reference is then made to M, D, T units while specifying the specific radicals.

Preferably, the reactive polyorganosiloxane (A) of the mold release agent composition (I) comprises the following siloxy units:

wherein:

$R^2$, $R^3$ and $R^4$ are radicals, which are identical or different, selected from the group consisting of:
  linear or branched $C_1$-$C_6$ alkyl radicals, such as for example methyl, ethyl, propyl, isopropyl, butyl, isobutyl, t-butyl, n-pentyl, n-hexyl,
  $C_3$-$C_8$ cycloalkyl radicals, such as for example cyclopentyl, cyclohexyl,
  $C_6$-$C_{10}$ aryl radicals, such as for example phenyl, naphthyl, and
  $C_7$-$C_{15}$ alkylaryl radicals, such as for example tolyl, xylyl.

More preferably still, the reactive polyorganosiloxane (A) of the mold release agent composition (I) is an α,ω-bis(hydroxy)polydimethylsiloxane.

Preferably, the reactive polyorganosiloxane (A) has a dynamic viscosity of between 50 and 600 000 mPa·s at 25° C. or a consistency of between 200 and 2000 expressed in tenths of millimeters at 25° C.

The dynamic viscosity of the silicones is measured at 25° C. according to the ASTM D 445 standard.

The term rubber is used for organosilicon compounds having viscosities conventionally greater than ~600 000 mPa·s which corresponds to a molecular weight of greater than 260 000 g/mol.

The consistency or penetrability of a rubber is determined at 25° C. by means of a penetrometer of PNR12 type or equivalent model that makes it possible to apply a cylindrical head to the sample under standardized conditions.

The penetrability of a rubber is the depth, expressed in tenths of millimeters, to which a calibrated cylinder penetrates into the sample over one minute.

For this purpose, a rubber sample is introduced into an aluminum cup having a diameter of 40 mm and a height of 60 mm.

The bronze or brass cylindrical head measures 6.35 mm in diameter and 4.76 mm in height and is borne by a metal rod that is 51 mm long and 3 mm in diameter which is compatible with the penetrometer. This rod is weighted by a 100 g loading. The total weight of the assembly is 151.8 g including 4.3 for the cylindrical part and its support rod.

The cup containing the rubber sample is placed in the bath thermostatically set at 25° C.±0.5° C. for at least 30 min. the measurement is carried out by following the manufacturer's instructions. The values of the depth (V) in tenths of a millimeter and of the time (t) in seconds for reaching this depth are indicated on the machine.

The penetrability is equal to 60V/t expressed in tenths of a millimeter per minute.

The silicone rubbers that can be used in accordance with the invention are used alone or as a mixture in an inorganic solvent. This solvent may be selected from volatile silicones, octamethylcyclotetrasiloxane (D4), decamethylcyclopentasiloxane (D5), polydimethylsiloxane (PDMS) oils, polyphenylmethylsiloxane (PPMS) oils or mixtures thereof, in order to avoid the use of organic solvents that are harmful to the environment and to the health of the workers in tire manufacturing workshops.

An α,ω-bis(hydroxy)polydimethylsiloxane oil having a dynamic viscosity of between 50 and 600 000 mPa·s at 25° C. and an α,ω-bis(hydroxy)polydimethylsiloxane rubber having a consistency of between 200 and 2000 expressed in tenths of millimeters at 25° C. are preferably used as constituents (A).

Preferably, the crosslinking agent (B) of the mold release agent composition (I) is chosen from those that have at least one unit of formula (II) and which are terminated by units of formula (Ill) or that are cyclic consisting of units of formula (II) represented below:

wherein:
  the $R^1$ symbols are identical or different and represent:
    a linear or branched alkyl radical containing 1 to 8 carbon atoms, which is unsubstituted or which is substituted by at least one fluorine,
    a cycloalkyl radical containing between 5 and 8 cyclic carbon atoms, or
    an aryl radical containing between 6 and 12 carbon atoms,
    an aralkyl radical having an alkyl part containing between 7 and 14 carbon atoms and an aryl part containing between 6 and 12 carbon atoms, which is unsubstituted or which is substituted on the aryl part by halogens, alkyls and/or alkoxyls containing 1 to 3 carbon atoms,
  the Z' symbols are similar or different and represent:
    a hydrogen radical, or
    a group corresponding to the same definition as that given above for $R^1$, with, per molecule, at least three of the Z' symbols representing a hydrogen radical H.

As an example of a crosslinking agent (B), mention may be made of the compound of formula (IV) below:

Error! Objects cannot be created from editing field codes. (IV)

wherein:
  x represents a whole or fractional number varying between 1 and 10 000,
  y represents a whole or fractional number varying between 0 and 10 000,
  $R'^1$ and $R'''^1$ represent, independently of one another:
    linear or branched alkyl radical containing 1 to 8 carbon atoms, which is unsubstituted or which is substituted by at least one halogen, preferably fluorine, the alkyl radicals preferably being methyl, ethyl, propyl, octyl and 3,3,3-trifluoropropyl,
    a cycloalkyl radical containing between 5 and 8 cyclic carbon atoms, an aryl radical containing between 6 and 12 carbon atoms, an aralkyl radical having an alkyl part containing between 5 and 14 carbon atoms and an aryl part containing between 6 and 12 carbon atoms, which is unsubstituted or which is substituted on the aryl part, $R'''^1$ possibly also corresponding to hydrogen, and with the condition according to which the polyorganosiloxane comprises at least three ≡SiH units.

As crosslinking agent (B), the following compounds are very particularly suitable for the invention:

Error! Objects cannot be created from editing field codes.
Error! Objects cannot be created from editing field codes.
S1 S2
with a, b, d and e representing a number varying from:
in the polymer of formula S1:
$0 \leq a \leq 10\,000$, preferably $0 \leq a \leq 8000$, preferably $0 \leq a \leq 5000$, and
$3 \leq b \leq 10\,000$ preferably $10 \leq b \leq 100$ preferably $20 \leq b \leq 60$
in the polymer of formula S2:
$1 \leq d \leq 10\,000$, preferably $20 \leq d \leq 60$, and
$0 \leq e \leq 10\,000$, preferably $0 \leq e \leq 1000$.

Within the context of the invention, the term "non-reactive" is understood to mean an oil that, under the conditions of emulsification, of preparation of the lubricating composition and of use, do not react chemically with any of the constituents of the composition.

Preferably, the non-reactive linear polyorganosiloxane oil (C) has a dynamic viscosity of the order of 0.65 to 100 000 mPa·s at 25° C. As an example, mention may be made of the linear polyorganosiloxanes:
consisting along each chain:
of units of formula $R^5R^6SiO_{2/2}$, optionally combined with units of formula $(R^5)_2SiO_{2/2}$,
of units of formula $(R^6)_2SiO_{2/2}$, optionally combined with units of formula $(R^5)_2SiO_{2/2}$,
of units of formula $R^5R^6SiO_{2/2}$ and of units of formula $(R^6)_2SiO_{2/2}$, optionally combined with units of formula $(R^5)_2SiO_{2/2}$,
and blocked at each chain end by a unit of formula $(R^7)_3SiO_{1/2}$, the $R^7$ radicals of which, which are identical or different, are selected from $R^5$ and $R^6$ radicals;
where the $R^5$ and $R^6$ radicals, monovalent organic substituents of the various siloxy units mentioned above, have the following definitions:
the $R^5$ radicals, which are identical to or different from one another, are selected from:
linear $C_1$-$C_6$ or branched $C_3$-$C_6$ alkyl radicals, such as for example methyl, ethyl, propyl, isopropyl, butyl, isobutyl, t-butyl, n-pentyl, n-hexyl,
$C_3$-$C_8$ cycloalkyl radicals, such as for example cyclopentyl, cyclohexyl, and
$C_2$-$C_8$ linear or $C_3$-$C_8$ branched alkenyl radicals such as for example vinyl, allyl,
the $R^6$ radicals, which are identical to or different from one another, are selected from:
$C_6$-$C_{10}$ aryl radicals, such as for example phenyl, naphthyl,
$C_7$-$C_{15}$ alkylaryl radicals, such as for example tolyl, xylyl, and
$C_7$-$C_{15}$ arylalkyl radicals such as for example benzyl.

The chemical composition of the glass beads (D) is of soda-lime or borosilicate type. Most industrially-produced glass belongs to the soda-lime type. This is composed predominantly of 71% to 75% sand ($SiO_2$), of 12% to 16% soda ($Na_2O$) and of 8% to 15% lime ($CaO$). Borosilicate glass differs from soda-lime glass by the presence of boron oxide ($B_2O_3$) and aluminum oxide ($Al_2O_3$).

Glass is an amorphous, i.e. non-crystalline, material. Therefore it has a high structural disorder. Its microscopic structure is such that there is no long-range order in a glass.

These glass beads are solid, i.e. not hollow. They may be surface-coated with silane-type coupling agents.

Preferably, the glass beads (D) have the following features:
a mean diameter of the particles measured according to the ISO 13320 standard of between 0.1 and 150 μm,
a bulk density measured according to ASTM D 3101-78 of between 1000 and 2000 kg/m³, and
an oil absorption measured according to ASTM D-1483 of between 10 and 30 g of oil per 100 g of spheres.

More preferably still, the glass beads (D) have the following features:
a mean diameter of the particles measured according to the ISO 13320 standard of between 0.5 and 100 μm,
a bulk density according to ASTM D 3101-78 of between 1200 and 1800 kg/m³, and
an oil absorption according to ASTM D-1483 of between 15 and 25 g of oil per 100 g of spheres.

More preferably still, the glass beads (D) have a mean diameter measured according to the ISO 13320 standard of between 12 and 70 μm.

The amount of glass beads in the mold release agent composition (I) varies between 0.1 and 20 parts by weight and preferably between 0.1 and 15 parts by weight relative to the total weight of the composition.

The nature of the surfactant (E) will be easily determined by a person skilled in the art, the objective being to prepare a stable emulsion. Anionic, cationic, non-ionic and zwitterionic surfactants may be used, alone or as a mixture.

It should be noted that the composition (I) according to the invention may also comprise protective colloids such as polyvinyl alcohol.

As anionic surfactant, mention may be made of the following surfactants:
alkyl ester sulfonates of formula $R^a$—$CH(SO_3M)$-$COOR^b$, where $R^a$ represents a $C_8$-$C_{20}$, preferably $C_{10}$-$C_{16}$, alkyl radical, $R^b$ a $C_1$-$C_6$, preferably $C_1$-$C_3$, alkyl radical and M an alkali metal cation (sodium, potassium, lithium), a substituted or unsubstituted ammonium (methyl-, dimethyl-, trimethyl-, tetramethylammonium, dimethylpiperidinium) or a derivative of an alkanolamine (monoethanolamine, diethanolamine, triethanolamine),
alkyl sulfates of formula $R^cOSO_3M$, where $R^c$ represents a $C_{10}$-$C_{24}$, preferably $C_{12}$-$C_{20}$, alkyl or hydroxyalkyl radical, M representing a hydrogen atom or a cation having the same definition as above, and also the ethoxylated (EO) and/or propoxylated (PO) derivatives thereof having preferably from 1 to 20 EO units,
alkylamide sulfates of formula $R^dCONHR^eOSO_3M$ where $R^d$ represents a $C_2$-$C_{22}$, preferably $C_6$-$C_{20}$, alkyl radical, $R^e$ a $C_2$-$C_3$ alkyl radical, M representing a hydrogen atom or a cation having the same definition as above, and also the ethoxylated (EO) and/or propoxylated (PO) derivatives thereof having preferably from 1 to 20 EO units,
salts of saturated or unsaturated $C_8$-$C_{24}$, preferably $C_{14}$-$C_{20}$, fatty acids, $C_9$-$C_{20}$ alkylbenzene sulfonates, and also the ethoxylated (EO) and/or propoxylated (PO) derivatives thereof having preferably from 1 to 20 EO units, $C_9$-$C_{20}$ alkylbenzene sulfonates, primary or secondary $C_8$-$C_{22}$ alkyl sulfonates, alkyl glyceryl sulfonates, the sulfonated polycarboxylic acids described in GB-A-1 082 179, paraffin sulfonates, N-acyl N-alkyl taurates, monoalkyl and dialkyl phosphates, alkyl isethionates, alkyl succinamates, alkyl sulfosuccinates, sulfosuccinate monoesters or diesters, N-acyl sarcosinates, alkyl glycoside sulfates, polyethoxycarboxylates, the cation being an alkali metal (sodium, potassium, lithium), a substituted or unsubstituted ammonium residue (methyl-, dimethyl-, trimethyl-, tetramethylammonium, dimethylpiperidinium) or a derivative of an alkanolamine (monoethanolamine, diethanolamine, triethanolamine).

As nonionic surfactants, mention may be made of poly (alkylene oxide) alkyl or aryl ethers, polyoxyethylenated sorbitan hexastearate, polyoxyethylenated sorbitan oleate and poly(ethylene oxide) cetylstearyl ethers. As poly(alkylene oxide) aryl ether, mention may be made of polyoxyethylenated alkylphenols. As poly(alkylene oxide) alkyl ether, mention may be made of polyethylene glycol isodecyl ether and polyethylene glycol trimethylnonyl ether containing from 3 to 15 ethylene oxide units per molecule.

Mention may also be made, as examples of surfactants, of: ionic, non-ionic or amphoteric fluorinated surfactants and mixtures thereof, for example:
perfluoroalkyls,
perfluorobetaines,
ethoxylated polyfluoroalcohols,
polyfluoroalkylammoniums,
surfactants in which the hydrophilic part contains one or more saccharide unit(s) bearing from five to six carbon atoms and in which the hydrophobic part contains a unit of formula $R^f(CH_2)_n$—, in which n=2 to 20 and $R^f$ represents a perfluoroalkyl unit of formula $C_mF_{2m+1}$, in which m=1 to 10; and
polyelectrolytes having fatty perfluoroalkyl side groups.

The term "fluorinated surfactant" is understood to mean, as is entirely known per se, a compound made up of an aliphatic perfluorocarbon-based part, comprising at least three carbon atoms, and an ionic, nonionic or amphoteric hydrophilic part. The perfluorocarbon-based part having at least three carbon atoms may represent either all, or only a fraction, of the fluorocarbon-based part of the molecule. As regards this type of compound, a large number of references are found in the literature. Those skilled in the art may refer in particular to the following references:
FR-A-2 149 519, WO-A-94 21 233, U.S. Pat. No. 3,194, 767, the book "Fluorinated Surfactants", Erik Kissa, published by Marcel Dekker Inc. (1994) Chapter 4, in particular tables 4.1 and 4.4.

Mention may in particular be made of the products sold by the company Du Pont under the name ZONYL®, for example FSO, FSN-100, FS-300, FSD, and also the FORAFAC® fluorinated surfactants distributed by the company DU PONT and the products sold under the name FLUORAD® by the company 3M.

Among these surfactants, mention will in particular be made of anionic, cationic, nonionic and amphoteric perfluoroalkylated compounds, and among them, more particularly, the surfactants of the class of ZONYL® compounds marketed by DU Pont, marketed by Du Pont respectively under the names ZONYL® FSA, ZONYL® FSO, ZONYL® FSC and ZONYL® FSK. The following may also be specified with respect thereto:
ZONYL® FSO 100: CAS 65545-80-4, (nonionic) 99% to 100%, the remainder being 1,4-dioxane,
ZONYL® FSN: CAS 65545-80-4, 99% to 100%, the remainder being sodium acetate and 1,4-dioxane,
ZONYL® FS-300: CAS 65545-80-4, 40%, the remainder being 1,4-dioxane (<0.1%) and water,
ZONYL®FSD: CAS 70983-60-7, 30%, (cationic), the remainder being hexylene glycol (10%), sodium chloride (3%) and water (57%).

Mention may also be made of:
perfluoroalkyl betaines (amphoteric) such as the one marketed by DU PONT under the name FORAFAC® 1157, ethoxylated polyfluoroalcohols (nonionic), such as the one marketed by DU PONT under the name FORAFAC 1110 D, polyfluoroalkylammonium salts (cationic), such as the one marketed by DU PONT under the name FORAFAC 1179;
surfactants in which the hydrophilic part contains one or more saccharide unit(s) containing from 5 to 6 carbon atoms (units derived from sugars such as fructose, glucose, mannose, galactose, talose, gulose, allose, altose, idose, arabinose, xylose, lyxose and/or ribose) and in which the hydrophobic part contains a unit of formula $R^F(CH_2)_n$, where n may range from 2 to 20, preferably from 2 to 10 and $R^F$ represents a perfluoroalkyl unit of formula $C_mF_{2m+1}$ with m possibly ranging from 1 to 10, preferably from 4 to 8, chosen from those having the features defined above; mention may be made of monoesters of perfluoroalkylated fatty acids and of sugars such as sucrose, it being possible for the monoester function to be represented by the formula $R^F(CH_2)_nC(O)$, where n may range from 2 to 10 and $R^F$ represents a perfluoroalkyl unit of formula $C_2F_{2,+1}$ with m possibly ranging from 4 to 8, described in Journal of the American Oil Chemists' Society (JAOCS), Vol. 69, No. 1 (January 1992) and chosen from those having the features defined above; and
polyelectrolytes having fatty perfluoroalkyl side groups, such as polyacrylates having $R^F(CH_2)_n$ groups where n may range from 2 to 20, preferably from 2 to 10 and $R^F$ represents a perfluoroalkyl unit of formula $C_mF_{2m+1}$ with m possibly ranging from 1 to 10, preferably from 4 to 8, chosen from those having the features defined above; mention may be made of polyacrylates having —$CH_2C_7F_{15}$ groups described in J. Chim. Phys. (1996) 93, 887-898 and chosen from those having the features defined above.

The amount of surfactant (E) is a function of the type of each of the constituents present and also of the very nature of the surfactant used. As a general rule, the emulsion comprises from 0.5% to 10% by weight of surfactant relative to the total weight of the emulsion.

Furthermore, conventionally and nonlimitingly, use may also be made, in the emulsions, of additives (F) such as film-forming polymers, antifoam adjuvants, biocides, rheology modifiers, coalescence agents, dispersing agents, acidifying agents, neutralizers, bases and/or thickeners, alone or as a mixture.

The concentrations of such adjuvants are known to a person skilled in the art.

The polyorganosiloxanes of the mold release agent composition (I) are polymerizable and/or crosslinkable by dehydrogenation-condensation. For this purpose, at least one dehydrogenation-condensation catalyst may be used. The dehydrogenation-condensation catalyst (G) may be present in the composition according to the invention. Its presence is only optional due to the temperatures encountered within the context of the application. Examples of dehydrogenation-condensation catalysts that can be used within the context of the invention are organometallic salts, and titanates such as tetrabutyl orthotitanate. As organometallic salt, mention may be made of zirconium naphthenate and zirconium octylate. Use may also be made of a catalytic tin compound, generally an organotin salt. The organotin salts that can be used are described in particular in the book by NOLL, Chemistry and Technology of Silicones, Academic Press (1968), page 397. It is also possible to define, as catalytic tin compound, either distannoxanes, or polyorganostannoxanes, or the reaction product of a tin salt, in particular a tin dicarboxylate, with polyethyl silicate, as described in patent U.S. Pat. No. 3,862,919.

The reaction product of an alkyl silicate or of an alkyltrialkoxysilane with dibutyltin diacetate, as described in the Belgian patent BE-A-842 305, may also be suitable.

According to another possibility, use may be made of a tin (II) salt, such as $SnCl_2$ or stannous octoate. The catalyst may be a tin salt of an organic acid, such as dibutyltin diacetate, dibutyltin dilaurate, dioctyltin dilaurate, dibutyltin dioctate, zinc naphthenate, cobalt naphthenate, zinc octylate, cobalt octylate and dioctyltin di(isomercaptoacetate). Examples of tin salts such as tin bischelates are described in patent applications EP-A-147 323 and EP-A-235 049, diorganotin dicarboxylates and, in particular, the catalysts are described in British patent GB-A-1 289 900 (dibutyltin or dioctyltin diacetate, dibutyltin or dioctyltin dilaurate).

Tin-free catalysts are also described in patent applications WO 2010/146253, WO 2010146254, WO 2010/149869, WO 2010/149870 and WO 2013/004926.

The dehydrogenation-condensation catalyst, when it is present, is generally introduced into the emulsion in an amount of from 0.05 to 5 parts by weight, relative to the total weight of the emulsion.

The water (H) is present, preferably, in proportions of between 20% and 90% and preferably, of between 30% and 80% by weight relative to the total weight of the composition. According to another embodiment, the mold release agent composition (I) used in the method for lubricating an expandable rubber bladder comprises:

from 0.1 to 30 parts by weight of at least one constituent (A),
from 0.1 to 20 parts by weight of at least one constituent (B),
from 0.1 to 30 parts by weight of at least one constituent (C),
from 0.1 to 20 parts by weight of at least one constituent (D),
from 0.1 to 10 parts by weight of at least one constituent (E),
from 0 to 5 parts by weight of the constituents (F),
from 0 to 5 parts by weight of at least one constituent (G),
from 20 to 90 parts by weight of the constituent (H);
per 100 parts by weight of the sum of the constituents (A) to (H).

According to another preferential embodiment, the mold release agent composition (I) used in the method for lubricating an expandable rubber bladder comprises:

from 1 to 20 parts by weight of at least one constituent (A),
from 1 to 10 parts by weight of at least one constituent (B),
from 1 to 20 parts by weight of at least one constituent (C),
from 0.1 to 15 parts by weight of at least one constituent (D),
from 0.1 to 10 parts by weight of at least one constituent (E),
from 0 to 5 parts by weight of the constituents (F),
from 0 to 5 parts by weight of at least one constituent (G),
from 30 to 80 parts by weight of the constituent (H);
per 100 parts by weight of the sum of the constituents (A) to (H).

The methods for applying the treatments are well known to persons in the art. They can particularly be applied by brush, sponge or spraying.

The application by spraying may be carried out in several passes in order to ensure that the coating is uniform and homogeneous.

More particularly, the invention relates to:
an expandable rubber bladder, coated on its outer surface with a composition (I) according to the invention, for shaping and vulcanizing green tires;
an expandable rubber bladder that can be obtained by heating the expandable bladder defined above, especially between 80° C. and 220° C., preferably between 150° C. and 200° C., so as to ensure the complete crosslinking of the crosslinkable constituents of the emulsion;
a green tire coated on its inner surface with a lubricating composition (I) according to the invention.

Another object of the present invention is to propose a method for vulcanizing a green tire using a bladder lubricated by the method according to the invention.

A final object of the present invention is to propose mold release agent compositions (I) characterized in that they comprise:

from 0.1 to 30 parts by weight of at least one constituent (A) comprising, per molecule, at least two ≡SiOH silanol groups;
from 0.1 to 20 parts by weight of at least one constituent (B) having, per molecule, at least three ≡SiH units;
from 0.1 to 30 parts by weight of at least one constituent (C) which is a linear homopolymer or copolymer which has, per molecule, monovalent organic substituents, which are identical to or different from one another, bonded to the silicon atoms, and which are selected from the group consisting of $C_1$-$C_6$ alkyl, $C_3$-$C_8$ cycloalkyl, $C_6$-$C_{10}$ aryl and $C_7$-$C_{15}$ alkylaryl radicals;
from 0.1 to 20 parts by weight of at least one constituent (D) as spherical amorphous filler;
from 0.1 to 10 parts by weight of at least one surfactant (E);
from 0 to 5 parts by weight of at least one additive (F) selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent;
from 0 to 5 parts by weight of at least one dehydrogenation-condensation catalyst (G);
from 20 to 90 parts by weight of water (H);
per 100 parts by weight of the sum of the constituents (A) to (H).

Preferably mold release agent compositions (I) comprise:
from 1 to 20 parts by weight of at least one constituent (A) comprising, per molecule, at least two ≡SiOH silanol groups;
from 1 to 10 parts by weight of at least one constituent (B) having, per molecule, at least three ≡SiH units;
from 1 to 20 parts by weight of at least one constituent (C) which is a linear homopolymer or copolymer which has, per molecule, monovalent organic substituents, which are identical to or different from one another, bonded to the silicon atoms, and which are selected from the group consisting of $C_1$-$C_6$ alkyl, $C_3$-$C_8$ cycloalkyl, $C_6$-$C_{10}$ aryl and $C_7$-$C_{15}$ alkylaryl radicals;

from 0.1 to 15 parts by weight of at least one constituent (D) as spherical amorphous filler;

from 0.1 to 10 parts by weight of at least one surfactant (E);

from 0 to 5 parts by weight of at least one additive (F) selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent;

from 0 to 5 parts by weight of at least one dehydrogenation-condensation catalyst (G);

from 30 to 80 parts by weight of water (H);

per 100 parts by weight of the sum of the constituents (A) to (H).

The compositions according to the invention are stable over time and the silicone coatings prepared from the compositions according to the invention simultaneously have:

a transparent surface appearance, a good lubricating property (Kd<0.7), and a good resistance to successive demolding operations.

Other advantages and features of the present invention will become apparent on reading the following examples given by way of illustration and with no implied limitation.

EXAMPLES

1) Raw materials used

Bluesil® Emulsion 242 sold by the company Bluestar Silicones: emulsion of α,ω-bis(hydroxy)polydimethylsiloxane oil having a viscosity approximately of 135 000 mPa·s at 25° C. (A) and comprising a surfactant (E).

Bluesil® Emulsion 244—company Bluestar Silicones: emulsion of a mixture of α,ω-bis(hydroxy)polydimethylsiloxane rubber (A) having a consistency approximately of 700 expressed in tenths of a millimetre at 25° C. and of polydimethylsiloxane oil (C) having a viscosity approximately of 50 mPa·s at 25'C and comprising a surfactant (E).

Bluesil® Emulsion 269 sold by the company Bluestar Silicones: emulsion of polymethyl-hydrosiloxane oil having a viscosity approximately of 25 $mm^2$/s at 25° C. (B) and comprising a surfactant (E).

Spheriglass 2530A CP01 sold by the company Potters: soda-lime glass beads surface-coated with a coupling agent, having a mean diameter of 56-70 μm (D) measured according to the ISO 13320 standard.

Spheriglass® 2000A CP01 sold by the company Potters: soda-lime glass beads surface-coated with a coupling agent, having a mean diameter of 27-36 μm (D) measured according to the ISO 13320 standard.

Spheriglass® 3000A CP01 sold by the company Potters: soda-lime glass beads surface-coated with a coupling agent, having a mean diameter of 12-26 μm (D) measured according to the ISO 13320 standard.

Spheriglass 3000E CP03 sold by the company Potters: borosilicate glass beads surface-coated with a coupling agent, having a mean diameter of 12-26 μm (D) measured according to the ISO 13320 standard.

Rhodopol® 23 sold by the company Solvay Novecare: xanthan gum, thickener (F).

Rheozan® sold by the company Solvay Novecare: succinoglycan gum, thickener (F).

Imbentin® T/050 sold by the company Dr Kolb: Isotrideceth 5, wetting agent (F).

Geropon® SDS sold by the company Solvay Novecare: Sodium dioctyl sulfosuccinate, wetting agent (F).

PEG 400 sold by the company Sigma-Aldrich: Polyethylene Glycol 400, wetting agent (F).

Silcolapse® 5001 sold by the company Bluestar Silicones: antifoam emulsion (F).

Silcolapse® 140 sold by the company Bluestar Silicones: antifoam emulsion (F).

Sodium citrate: pH regulator (F).

Proxel GXL sold by the company Arch Chemicals: 1,2-benzisothiazolin-3-one, biocide (F).

Axilat® Ultra Green DS2800 sold by the company Hexion Chemicals: dispersion of film-forming polymer (F)

Alsibronz® 39 sold by the company Engelhard: mica, platy filler.

The % indicated below are by weight relative to the total weight of the composition.

2) Preparations of the examples

Comparative Example 1 (C1)

Formulation Without Glass Beads

In a 2-liter beaker with a diameter of 120 mm, produce a first mixture (P1):

introduce 52.22% water (H) and stir at 100 rpm using a disperser equipped with a deflocculating impeller having a diameter of 100 mm;

then introduce 0.03% Geropon® SDS (F), 0.9% PEG400 (F), 0.5% Silcolapse® 140 (F);

increase the speed to 600 rpm and introduce 0.23% Rheozan® (F) steeped in 0.69% Imbentin® T/050 (F);

disperse for 10 min at 600 rpm and stop the disperser.

At the same time, in a 1-liter beaker with a diameter of 90 mm, prepare a second mixture (P2):

introduce 22% Bluesil® Emulsion 244 (A & C) and stir at 100 rpm using a disperser equipped with an anchor impeller having a diameter of 80 mm, then introduce 11.2% Bluesil® Emulsion 242 (A), 0.15% Proxel® GXL (F), 0.08% phosphoric acid (F), and homogenize for 5 min, and introduce 5% Axilat® Ultragreen DS2800 (F) and homogenize for 5 min, and finally introduce 7% Bluesil® Emulsion 269 (B), homogenize for 5 min.

Finally, introduce the mixture (P2) into (P1) while stirring at 300 rpm with the aid of a disperser equipped with an anchor impeller having a diameter of 80 mm and homogenize for 30 min.

After homogenization, the mold release agent composition (C1) is thus obtained.

Comparative Example 2 (C2)

Formulation With Mica

The procedure of comparative example 1 is followed but 10% water are replaced by 10% Alsibronz 39.

Example according to the invention (E1)

The procedure of comparative example 1 is followed but 10% water are replaced by 10% Spheriglass® 2530A CP01 (D).

Example according to the invention (E2)

The procedure of the example (E1) is followed but only 3% water are replaced by 3% Spheriglass® 2530A CP01 (D).

Example according to the invention (E3)

The procedure of the example (E1) is followed but Spheriglass® 2000A CP01 glass beads are used as a replacement for Spheriglass® 2530A CP01 (D).

Example according to the invention (E4)

The procedure of the example (E1) is followed but Spheriglass® 3000A CP01 glass beads are used as a replacement for Spheriglass® 2530A CP01 (D).

Example according to the invention (E5)

The procedure of the example (E1) is followed but only 3% water are replaced by 3% Spheriglass® 3000A CP01 (D).

Example according to the invention (E6)

In a 2-liter beaker with a diameter of 120 mm, produce a first mixture (Q1):
introduce 44.71% water (H) and stir at 100 rpm using a disperser equipped with a deflocculating impeller having a diameter of 100 mm;
then introduce 0.1% Imbentin® T/050 (F), 1.8% Silcolapse® 5001 (F) and 3% Spheriglass® 3000A CP01;
increase the speed to 600 rpm and introduce 0.25% Rhodopol®23 (F) steeped in 0.5% Imbentin® T/050;
disperse for 10 min at 600 rpm and stop the disperser.

At the same time, in a 1-liter beaker with a diameter of 90 mm, prepare a second mixture (Q2):
introduce 30% Bluesil® Emulsion 244 (A & C) and stir at 100 rpm using a disperser equipped with an anchor impeller having a diameter of 80 mm, then
introduce 7.47% Bluesil® Emulsion 242 (A), 0.04% sodium citrate (F), 0.15% Proxel® GXL (F), 0.07% phosphoric acid (F), and homogenize for 5 min, and finally introduce 11.91% Bluesil® Emulsion 269 (B), homogenize for 5 min.

Finally, introduce the mixture (Q2) into (Q1) while stirring at 300 rpm with the aid of a disperser equipped with an anchor impeller having a diameter of 80 mm and homogenize for 30 min.

After homogenization, the mold release agent composition (E6) is obtained.

Example according to the invention (E7)

In a 2-liter beaker with a diameter of 120 mm, produce a first mixture (Q3):
introduce 47.45% water (H) and stir at 100 rpm using a disperser equipped with a deflocculating impeller having a diameter of 100 mm;
then introduce 0.1% Imbentin® T/050 (F), 1.8% Silcolapse® 5001 (F) and 3% Spheriglass® 3000E CP03;
increase the speed to 600 rpm and introduce 0.26% Rhodopol®23 (F) steeped in 0.52% Imbentin® T/050;
disperse for 10 min at 600 rpm and stop the disperser.

At the same time, in a 1-liter beaker with a diameter of 90 mm, prepare a second mixture (Q4):
introduce 30% Bluesil® Emulsion 244 (A & C) and stir at 100 rpm using a disperser equipped with an anchor impeller having a diameter of 80 mm, then
introduce 7.47% Bluesil® Emulsion 242 (A), 0.04% sodium citrate (F), 0.15% Proxel® GXL (F), 0.07% phosphoric acid (F), and homogenize for 5 min, and finally introduce 9.14% Bluesil® Emulsion 269 (B), homogenize for 5 min.

Finally, introduce the mixture (Q4) into (Q3) while stirring at 300 rpm with the aid of a disperser equipped with an anchor impeller having a diameter of 80 mm and homogenize for 30 min.

After homogenization, the mold release agent composition (E7) is obtained.

Example according to the invention (E8)

In a 2-liter beaker with a diameter of 120 mm, produce a first mixture (Q5):
introduce 47.45% water (H) and stir at 100 rpm using a disperser equipped with a deflocculating impeller having a diameter of 100 mm;
then introduce 0.1% Imbentin® T/050 (F), 1.8% Silcolapse® 5001 (F) and 3% Spheriglass® 3000A CP03;
increase the speed to 600 rpm and introduce 0.26% Rhodopol®23 (F) steeped in 0.52% Imbentin® T/050;
disperse for 10 min at 600 rpm and stop the disperser.

At the same time, in a 1-liter beaker with a diameter of 90 mm, prepare a second mixture (Q6):
introduce 30% Bluesil® Emulsion 244 (A & C) and stir at 100 rpm using a disperser equipped with an anchor impeller having a diameter of 80 mm, then
introduce 7.47% Bluesil® Emulsion 242 (A), 0.04% sodium citrate (F), 0.15% Proxel® GXL (F), 0.07% phosphoric acid (F), and homogenize for 5 min, and finally introduce 9.14% Bluesil® Emulsion 269 (B), homogenize for 5 min.

Finally, introduce the mixture (Q6) into (Q5) while stirring at 300 rpm with the aid of a disperser equipped with an anchor impeller having a diameter of 80 mm and homogenize for 30 min.

After homogenization, the mold release agent composition (E8) is obtained.

3) Characterization Tests

The properties of the compositions are measured by evaluating the friction coefficients and the number of demolding operations carried out without failure.

A low friction coefficient reflects good slip properties.

A high number of demolding operations reflects a high durability of the lubrication of the bladder.

The test for measuring the coefficients of friction and the durability were adapted to the application of the lubricating composition to an expandable rubber bladder.

Slip Test

The objective of this test is to assess the slip ability of a mold release agent composition placed at the interface between the expandable bladder and the inner surface of the casing of a tire.

This test is carried out by sliding a metal block of predetermined weight, under which a tire casing film (50×75 mm) is attached, over a rubber surface, the composition of which is that of the expandable bladder.

The surface of the expandable bladder is pre-coated with the mold release agent composition.

The friction coefficient is measured using a tensiometer (at a speed of 50 mm/min). Five successive passes are carried out on the same expandable bladder sample, the tire casing sample being changed each time.

The friction coefficient (Kd) corresponds to:

$$Kd(\text{dimensionless}) = \frac{\text{average force for conveying the block (in } N)}{\text{Weight of the block (in } N)}$$

The value of Kd mentioned in table 1 corresponds to the average of values obtained during the 5 passes.

A layer of around 20 μm is deposited. After drying in air, the assembly is cured at 170° C. for at least 10 minutes.

The coated sheet is placed in a metal mold in a press. The platens are heated at 170° C. The sheet is left to preheat for 5 minutes, then a piece of green ILR (inner liner rubber, i.e. rubber that forms the inner surface of a green tire) having a thickness of around 9 cm is deposited on the sheet coated with the mold release agent composition. The mold is closed, followed by the press, and the ILR is left to cure for 7 minutes at 170° C. The mold is opened and the thin molded ILR sheet is removed.

In order for a demolding operation to be considered to be successful, the sheet must be separated without applying force and without sticking. Otherwise, the demolding operation is recorded as a failure.

The number of demolding operations corresponds to the number of ILR sheets removed from the mold without sticking.

TABLE 1

3) Results of the tests:

| Ref. | Filler | Filler mean size (μm) | Filler [%] | Number of demolding operations | Friction coefficient (Kd) | Film appearance |
|---|---|---|---|---|---|---|
| C1 | No filler | NC | NC | 8 | 0.38 | Transparent |
| C2 | Mica 39 | ~39 | 10 | 4 | 0.34 | Translucent |
| E1 | Spheriglass ® 2530A CP01 | 56-70 | 10 | 18 | 0.32 | Transparent |
| E2 | Spheriglass ® 2530A CP01 | 56-70 | 3 | 14 | 0.55 | Transparent |
| E3 | Spheriglass ® 2000A CP01 | 27-36 | 10 | 12 | 0.30 | Transparent |
| E4 | Spheriglass ® 3000A CP01 | 12-26 | 10 | 18 | 0.28 | Transparent |
| E5 | Spheriglass ® 3000A CP01 | 12-26 | 3 | 18 | 0.32 | Transparent |
| E6 | Spheriglass ® 3000A CP01 | 12-26 | 3 | 18 | 0.2 | Transparent |
| E7 | Spheriglass ® 3000E CP03 | 12-26 | 3 | 10 | 0.38 | Transparent |
| E8 | Spheriglass ® 3000A CP03 | 12-26 | 3 | 16 | 0.45 | Transparent |

The lower the friction coefficient values, the better the slip properties of the lubricating composition.

This slip test is perfectly representative of the performance to be achieved on industrial tooling, and is a first selection criterion.

Demolding Test:

The durability of a lubricating composition corresponds to the number of tires produced without degradation of the surface of the expandable bladder.

For this, an expandable bladder film, pre-coated with the mold release agent composition to be evaluated, is pressed into contact with an unvulcanised tire casing film in a series of pressure and temperature cycles that simulate the steps of manufacturing a tire on industrial tooling.

In detail, a sheet of rubber, having a composition identical to that of the bladder and having a size of 2 mm×80 mm×80 mm is prepared in a heated press at 200° C. for 30 minutes. The sheet is surface-structured to simulate the surface of a bladder.

This sheet is coated in a paint booth by spraying the mold release agent composition with a compressed air spray gun.

Compared to the comparative example (C1) with no filler, the addition of mica to a mold release agent composition as described in patent application EP 1 899 447 (comparative example C2) degrades the number of demolding operations by 50%, and therefore degrades the durability of the bladder.

On the other hand, the examples according to the invention (E1 to E8) unambiguously show that the addition of glass beads makes it possible to increase the number of demolding operations, and therefore the durability of the bladder, by 1.25 to 2.25 times relative to (C1) and by 2.5 to 4.5 times relative to (C2) and this being at the same time as good slip properties.

In conclusion, the use of glass beads, unlike mica, does not degrade the durability of the bladder coated with the mold release agent composition according to the invention. Furthermore, unlike mica, the formulations based on glass beads result in transparent films.

The invention claimed is:
1. A method of lubricating an expandable rubber bladder for use during a vulcanization of a green tire within a metal press, the method comprising coating the outer surface of the bladder, brought to be in contact with the inner face of the green tire, with a mold release agent composition (I) in the form of an oil-in-water emulsion, wherein the composition (I) comprises:
- (a) at least one reactive polyorganosiloxane (A) comprising, per molecule, at least two ≡SiOH silanol groups;
- (b) at least one crosslinking agent (B) having, per molecule, at least three ≡SiH units;
- (c) at least one non-reactive linear polyorganosiloxane oil (C) which is a linear homopolymer or copolymer which has, per molecule, monovalent organic substituents, which are identical to or different from one another, bonded to the silicon atoms, and which are selected from the group consisting of $C_1$-$C_6$ alkyl, $C_3$-$C_8$ cycloalkyl, $C_6$-$C_{10}$ aryl and $C_7$-$C_{15}$ alkylaryl radicals;
- (d) glass beads (D) as spherical amorphous filler;
- (e) at least one surfactant (E);
- (f) optionally at least one additive (F) selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent;
- (g) optionally at least one dehydrogenation-condensation catalyst (G), and
- (h) water (H), the amounts of surfactant(s) and of water being sufficient to obtain an oil-in-water emulsion;

with the proviso that the composition (I) does not comprise a mica-type filler to evacuate air;

the method making it possible to obtain an expandable rubber bladder that is lubricated on its outer surface and resulting in several green tire molding and vulcanized tire demolding cycles.

2. The method as claimed in claim 1, wherein the glass beads (D) of the mold release agent composition (I) have the following features:
- a mean diameter of particles measured according to ISO 13320 standard of from 0.1 μm to 150 μm,
- a bulk density measured according to ASTM D 3101-78 of from 1000 kg/m³ to 2000 kg/m³, and
- an oil absorption measured according to ASTM D-1483 of from 10 g to 30 g of oil per 100 g of spheres.

3. The method as claimed in claim 1, wherein the glass beads (D) of the mold release agent composition (I) have the following features:
- a mean diameter of the particles measured according to the ISO 13320 standard of from 0.5 μm to 100 μm,
- a bulk density according to ASTM D 3101-78 of from 1200 kg/m³ to 1800 kg/m³, and
- an oil absorption according to ASTM D-1483 of from 15 g to 25 g of oil per 100 g of spheres.

4. The method as claimed in claim 1, wherein the reactive polyorganosiloxane (A) of the mold release agent composition (I) comprises the following siloxy units:

$M^{OH}=[(OH)(R^2)_2SiO_{1/2}]$ and $D=[R^3R^4SiO_{2/2}]$ wherein:
$R^2$, $R^3$ and $R^4$ are radicals, which are identical or different, selected from the
group consisting of:
- linear or branched $C_1$-$C_6$ alkyl radicals,
- $C_3$-$C_8$ cycloalkyl radicals,
- $C_6$-$C_{10}$ aryl radicals, and
- $C_7$-$C_{15}$ alkylaryl radicals.

5. The method as claimed in claim 1, wherein the reactive polyorganosiloxane (A) of the mold release agent composition (I) is an α,ω-bis(hydroxy)polydimethylsiloxane.

6. The method as claimed in claim 1, wherein the crosslinking agent (B) of the mold release agent composition (I) is selected from those that have at least one unit of formula (II) and that are terminated by units of formula (III) or that are cyclic having units of formula (II) represented below:

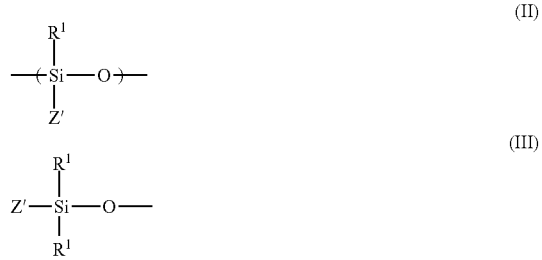

wherein:
the $R^1$ symbols are identical or different and represent:
- a linear or branched alkyl radical having 1 to 8 carbon atoms, which is unsubstituted or which is substituted by at least one fluorine,
- a cycloalkyl radical having 5 to 8 cyclic carbon atoms, or
- an aryl radical having 6 to 12 carbon atoms,
- an aralkyl radical having an alkyl part having 5 to 14 carbon atoms and an aryl part having 6 to 12 carbon atoms, which is unsubstituted or which is substituted on the aryl part by halogens, alkyls and/or alkoxyls having 1 to 3 carbon atoms, the Z' symbols are similar or different and represent
- a hydrogen radical, or
- a group corresponding to the same definition as that given above for $R^1$, with, per molecule, at least three of the Z' symbols representing H.

7. The method as claimed in claim 1, wherein the mold release agent composition (I) comprises:
- from 0.1 to 30 parts by weight of at least one constituent (A),
- from 0.1 to 20 parts by weight of at least one constituent (B),
- from 0.1 to 30 parts by weight of at least one constituent (C),
- from 0.1 to 20 parts by weight of at least one constituent (D),
- from 0.1 to 10 parts by weight of at least one constituent (E),
- from 0 to 5 parts by weight of the constituent (F),
- from 0 to 5 parts by weight of at least one constituent (G),
- from 20 to 90 parts by weight of the constituent (H);

per 100 parts by weight of the sum of the constituents (A) to (H).

8. A lubricated expandable bladder obtained by the method as claimed in claim 1.

9. A method of vulcanizing a green tire, the method comprising using a lubricated bladder as described in claim 8.

10. A method of lubricating an expandable rubber bladder for use during a vulcanization of a green tire within a metal press, the method comprising in a first step outside of the press, coating the inner surface of the green tire with a mold release agent composition (I) in the form of an oil-in-water emulsion, wherein the composition (I) comprises:

(a) at least one reactive polyorganosiloxane (A) comprising, per molecule, at least two ≡SiOH groups;
(b) at least one crosslinking agent (B) having, per molecule, at least three ≡SiH units;
(c) at least one non-reactive linear polyorganosiloxane oil (C) which is a linear homopolymer or copolymer which has, per molecule, monovalent organic substituents, which are identical to or different from one another, bonded to the silicon atoms, and which are selected from the group consisting of $C_1$-$C_6$ alkyl, $C_3$-$C_8$ cycloalkyl, $C_6$-$C_{10}$ aryl and $C_7$-$C_{15}$ alkylaryl radicals;
(d) glass beads (D) as spherical amorphous filler;
(e) at least one surfactant (E);
(f) optionally at least one additive (F) selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent
(g) optionally at least one dehydrogenation-condensation catalyst (G), and
(h) water (H),
the amounts of surfactant(s) and of water being sufficient to obtain an oil-in-water emulsion;
the step thus making it possible to obtain a green tire, the inner surface of which is coated with the composition (I) and
during a subsequent step within the metal press, the green tire, the inner surface of which is coated with said composition (I), is brought into contact with an expandable rubber bladder;
with the proviso that the composition (I) does not comprise a mica-type filler to evacuate air;
the method making it possible thus to obtain, by transfer, an expandable rubber bladder that is lubricated on its outer face and resulting in several green tire molding and vulcanized tire demolding cycles.

11. The method as claimed in claim 10, wherein the glass beads (D) of the mold release agent composition (I) have the following features:
a mean diameter of particles measured according to ISO 13320 standard of from 0.1 μm to 150 μm,
a bulk density measured according to ASTM D 3101-78 of from 1000 kg/m³ to 2000 kg/m³,
an oil absorption measured according to ASTM D-1483 of from 10 g to 30 g of oil per 100 g of spheres.

12. The method as claimed in claim 10, wherein the glass beads (D) of the mold release agent composition (I) have the following features:
a mean diameter of the particles measured according to the ISO 13320 standard of from 0.5 μm to 100 μm,
a bulk density according to ASTM D 3101-78 of from 1200 kg/m³ to 1800 kg/m³, and
an oil absorption according to ASTM D-1483 of from 15 g to 25 g of oil per 100 g of spheres.

13. The method as claimed in claim 10, wherein the reactive polyorganosiloxane (A) of the mold release agent composition (I) comprises the following siloxy units:

$M^{OH}=[(OH)(R^2)_2SiO_{1/2}]$ and $D=[R^3R^4SiO_{2/2}]$ wherein:
$R^2$, $R^3$ and $R^4$ are radicals, which are identical or different, selected from the group consisting of:
linear or branched $C_1$-$C_6$ alkyl radicals,
$C_3$-$C_8$ cycloalkyl radicals,
$C_6$-$C_{10}$ aryl radicals, and
$C_7$-$C_{15}$ alkylaryl radicals.

14. The method as claimed in claim 10, wherein the reactive polyorganosiloxane (A) of the mold release agent composition (I) is an α,ω-bis(hydroxy)polydimethylsiloxane.

15. The method as claimed in claim 10, wherein the crosslinking agent (B) of the mold release agent composition (I) is selected from those that have at least one unit of formula (II) and that are terminated by units of formula (Ill) or that are cyclic having units of formula (II) represented below:

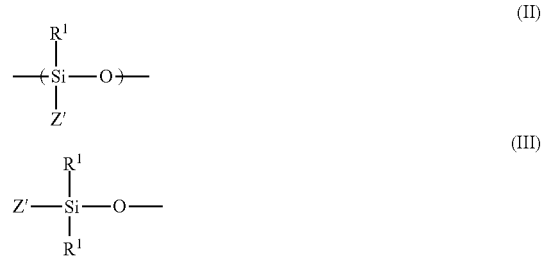

wherein:
the $R^1$ symbols are identical or different and represent:
a linear or branched alkyl radical having 1 to 8 carbon atoms, which is unsubstituted or which is substituted by at least one fluorine,
a cycloalkyl radical having 5 to 8 cyclic carbon atoms, or
an aryl radical having 6 to 12 carbon atoms,
an aralkyl radical having an alkyl part having 5 to 14 carbon atoms and an aryl part having 6 to 12 carbon atoms, which is unsubstituted or which is substituted on the aryl part by halogens, alkyls and/or alkoxyls having 1 to 3 carbon atoms,
the Z' symbols are similar or different and represent:
a hydrogen radical, or
a group corresponding to the same definition as that given above for $R^1$,
with, per molecule, at least three of the Z' symbols representing H.

16. The method as claimed in claim 10, wherein the mold release agent composition (I) comprises:
from 0.1 to 30 parts by weight of at least one constituent (A),
from 0.1 to 20 parts by weight of at least one constituent (B),
from 0.1 to 30 parts by weight of at least one constituent (C),
from 0.1 to 20 parts by weight of at least one constituent (D),
from 0.1 to 10 parts by weight of at least one constituent (E),
from 0 to 5 parts by weight of the constituent (F),
from 0 to 5 parts by weight of at least one constituent (G),
from 20 to 90 parts by weight of the constituent (H);
per 100 parts by weight of the sum of the constituents (A) to (H).

17. A lubricated expandable bladder obtained by the method as claimed in claim 10.

18. A method of vulcanizing a green tire, the method comprising using a lubricated bladder as described in claim 17.

19. A mold release agent composition (1), wherein the composition comprises:

from 0.1 to 30 parts by weight of at least one constituent (A) comprising, per molecule, at least two ≡SiOH silanol groups;

from 0.1 to 20 parts by weight of at least one constituent (B) having, per molecule, at least three ≡SiH units;

from 0.1 to 30 parts by weight of at least one constituent (C) which is a linear homopolymer or copolymer which has, per molecule, monovalent organic substituents, which are identical to or different from one another, bonded to the silicon atoms, and which are selected from the group consisting of $C_1$-$C_6$ alkyl, $C_3$-$C_8$ cycloalkyl, $C_6$-$C_{10}$ aryl and $C_7$-$C_{15}$ alkylaryl radicals;

from 0.1 to 20 parts by weight of at least one constituent (D) as spherical amorphous filler, wherein the at least one constituent (D) is a glass bead;

from 0.1 to 10 parts by weight of at least one surfactant (E);

from 0 to 5 parts by weight of at least one additive (F) selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent;

from 0 to 5 parts by weight of at least one dehydrogenation-condensation catalyst (G);

from 20 to 90 parts by weight of water (H); and per 100 parts by weight of the sum of the constituents (A) to (H); and with the proviso that the composition (I) does not comprise a mica-type filler to evacuate air.

* * * * *